US006277294B1

(12) United States Patent
Ozaki et al.

(10) Patent No.: US 6,277,294 B1
(45) Date of Patent: Aug. 21, 2001

(54) METHOD OF PRODUCING INK JET HEAD VALVE, METHOD OF PRODUCING INK JET HEAD AND INK JET HEAD PRODUCED BY THE METHOD

(75) Inventors: Teruo Ozaki, Yokohama; Masahiko Ogawa, Hino; Masami Ikeda, Tokyo; Ichiro Saito, Yokohama; Hiroyuki Ishinaga, Tokyo; Tomoyuki Hiroki, Zama; Yoshiyuki Imanaka, Kawasaki; Masahiko Kubota, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/203,393

(22) Filed: Dec. 2, 1998

(30) Foreign Application Priority Data

Dec. 5, 1997 (JP) .................................................. 9-336059

(51) Int. Cl.[7] ............................ G01D 15/00; B23P 17/00
(52) U.S. Cl. ............................ 216/27; 29/890.1; 118/715
(58) Field of Search .......................... 216/27, 2; 118/715; 156/345; 29/890.1

(56) References Cited

U.S. PATENT DOCUMENTS

| | | | |
|---|---|---|---|
| 4,723,129 | 2/1988 | Endo et al. | 346/1.1 |
| 5,278,585 | 1/1994 | Karz et al. | 346/140 R |

FOREIGN PATENT DOCUMENTS

| | | |
|---|---|---|
| 0 739 734 A2 | 10/1996 | (EP) . |
| 0 899 104 A2 | 3/1999 | (EP) . |
| 63-197652 | 8/1988 | (JP) . |
| 63-199972 | 8/1988 | (JP) . |
| 5-131636 | 5/1993 | (JP) . |
| 9-201966 | 8/1997 | (JP) . |

*Primary Examiner*—Gregory Mills
*Assistant Examiner*—P. Hassanzadeh
(74) *Attorney, Agent, or Firm*—Fitzpatrick, Cella, Harper & Scinto

(57) ABSTRACT

A method of producing an ink jet head valve for an ink jet head having a discharge port for discharging ink, an ink flow path communicated with said discharge port and an electro-thermal converting member used as an energy generating means for discharging ink into said ink flow path, comprises the step of producing said ink jet head valve by a metal CVD process.

3 Claims, 4 Drawing Sheets

METHOD OF PRODUCING INK JET HEAD VALVE, METHOD OF PRODUCING INK JET HEAD AND INK JET HEAD PRODUCED BY THE METHOD

BACKGROUND OF THE INVENTION

1. Field of the Invention

The present invention relates to a method of producing an ink jet head valve, a method of producing an ink jet head and an ink jet head produced by the method.

2. Related Background Art

An ink jet recording process, the so-called bubble jet recording process, in which a state change including a rapid volume change of ink (i.e., generation of bubbles) is caused to be generated by imparting energy such as heat or the like to the ink, the ink is discharged from a discharge port by an active force due to this state change and the discharged ink is adhered to a medium to be recorded to perform an image formation, has been well known. In the recording device using this bubble jet recording process, as disclosed in publications of the specification of U.S. Pat. No. 4,723,129 and the like, there are generally provided a discharge port for discharging ink, an ink flow path communicated with this discharge port and an electrothermal converting member used as an energy generating means for discharging ink provided in the ink flow path.

According to such recording process, a high quality level image can be recorded at high speed and low noise and a discharge port for discharging ink can be provided at high density in a head in this recording process. Therefore, the recording process has a number of advantages, that including a high resolution recording image and such a color image could easily be obtained in a compact device. Thus, this bubble jet recording process has recently been used in various office equipment such as a printer, copy machine, facsimile and the like. Further, the recording process is used even in an industrial system such as a printing equipment etc.

With the increased use of the bubble jet technology in products in many fields, the following various demands have recently increased.

For example, an answer the demand for improvement of energy efficiency includes optimization of a heating element in which the thickness of a protective film is controlled. This technology has an advantage in that the transmission efficiency of generated heat to liquid is enhanced.

Further, to obtain a high definition image, there is provided a driving condition for imparting a liquid discharging method in which an improved ink discharge based on a stable bubble generation can be performed. Furthermore, to obtain a liquid discharge head having a high refilling speed of a discharged liquid to a liquid flow path from the viewpoint of high speed recording, there is also provided a liquid discharge head having improved shapes of the liquid flow path.

A flow path structure and a head producing method disclosed in Japanese Patent Laid-open Application No. 63-199972, relating to the shapes of the flow path, are inventions directed to a back wave (pressure in a direction opposite to that toward a discharge port, that is, pressure toward a liquid chamber) which is generated with the generation of bubbles. This back wave is known as a loss energy since it is not an energy toward the discharge direction.

A head disclosed in the Japanese Patent Laid-open Application No. 63-199972, has an ink jet head valve which is spaced from a bubbling area of bubbles formed by the heating element and is positioned at the side opposite to the discharge port with respect to the heating element. This valve has an initial position in a manner that it is adhered to the ceiling of the flow path by a head producing method using a plate material, and is hung down in the flow path with the generation of bubbles. This application discloses an invention in which energy loss is controlled by controlling a part of the above-mentioned back wave with a valve.

Further, to realize improvements of liquid discharge properties including control of the back wave, and of liquid supply properties, Japanese Patent Laid-open Application No. 9-201966 discloses a constitution in which a movable member is provided facing a bubble generation area which generates bubbles, and the growth of bubbles is controlled by using displacement of the movable member, generated by pressure at the time of bubble generation.

FIG. 4 shows a partially broken perspective view of one embodiment of a liquid discharging head provided with such ink jet head valve.

In the liquid discharging head in FIG. 4, a heating element 2 which allows heat energy to act on liquid is provided on an element substrate 1 as a discharge energy generating element for discharging liquid. Liquid flow paths 7 are provided on this element substrate 1 corresponding to the heating element 2. The liquid flow paths 7 are communicated with a discharge port 5, and are also communicated with a common liquid chamber 13 for supplying liquid to the plurality of liquid flow paths 7, thereby receiving an amount of liquid corresponding to the liquid discharged from a discharge port, from this common liquid chamber 13.

On the element substrate 1 of liquid flow paths 7 is provided an ink jet head valve in which a 1 $\mu$m thick plate-shaped movable member 6 having a flat surface portion, which is composed of an elastic material, such as a thin film resin, metal or the like, is provided like a cantilever beam.

In FIG. 4, when the heating element 2 is heated, heat acts on liquid in a bubble generation region between the movable member 6 and heating element, thereby generating bubbles based on the film boiling phenomena. The pressure and bubbles based on the generation of bubbles act on the movable member 6 and cause the member 6 to be displaced so that the member is largely opened on a liquid discharge side using a fulcrum 6a as the center of rotation, whereby the pressure generated by generation of bubbles and the bubbles themselves can be led to the downstream side where the discharge port 5 is provided.

To produce the above-mentioned ink jet head valve, a valve material produced by an electroforming process or the like was used to laminate the material on a substrate.

When the valve material is laminated on the substrate, it is necessary to provide a space of about 1 to 20 $\mu$m between the movable member and heating element so as to sufficiently obtain effects of the movable member. Further, to laminate the valve material produced by the electroforming process or the like so that a space can be formed in the movable portions, it is necessary to form a pedestal portion on the substrate so that a valve is previously fixed onto the substrate.

Further, to form the pedestal portion having for example 5 $\mu$m, which is merely the height of the space, and to prevent the pedestal portion from being corroded with ink, it is necessary to form the portion by an Au plating process or the like. To perform the Au plating, sputtering of Au and patterning thereof by the photolithography technology are needed.

Further, it is necessary to provide an electroformed valve on a surface of the Au pedestal after the Au plating, make positioning of the valve and fix the valve by a stud bump process or the like. However, it is difficult to position the valve with high precision.

Therefore, not only the thickness control of the valve and positioning of the valve were difficult, but also the production steps were extremely complicated.

Accordingly, the objects of the present invention are to solve the above-mentioned problems and provide a method of producing an improved ink jet head valve, a method of producing an ink jet head, and an ink jet head produced by the method.

SUMMARY OF THE INVENTION

The above-mentioned objects of the present invention can be attained by the following means.

In accordance with the present invention, there is provided a method of producing an ink jet head valve for an ink jet head having a discharge port for discharging ink, an ink flow path communicated with said discharge port and an electrothermal converting member used as an energy generating means for discharging ink into said ink flow path, comprising the step of producing said ink jet head valve by a metal CVD process.

In accordance with another aspect of the present invention, there is provided a method of producing an ink jet head having a discharge port for discharging ink, an ink flow path communicated with said discharge port and an electrothermal converting member used as an energy generating means for discharging ink into said ink flow path, comprising the steps of:

- preparing a substrate provided with said electrothermal converting member and having a conducting portion on the surface of said substrate;
- forming a first masking layer for forming a pedestal portion of a valve of said ink jet head on said substrate surface;
- etching a portion of said first masking layer, said portion being a portion where the pedestal portion of said valve is formed;
- forming said pedestal portion by the metal CVD process and forming a conducting layer on said pedestal portion and first masking layer;
- forming a second masking layer on said conducting layer and etching a portion of said second masking layer, said portion being a portion where a movable member is formed; and
- removing said first and second masking layers after forming said movable member on said conducting layer by the metal CVD process.

In accordance with another aspect of the present invention, there is provided an ink jet head produced by the above-mentioned method.

It is preferable that the ink jet head valve and ink jet head are produced by using Ta, W, Pt, Mo, Cr, Mn, Fe, Co, Ni, or Cu.

Further, it is preferable that the conducting layer is formed by compression stress and said movable member is formed by tensile stress.

According to the present invention, positioning of a high precision valve obtained by the photolithography steps can be realized and controlling of the valve thickness can be easily performed, whereby simplified steps can be realized.

DETAILED DESCRIPTION OF THE PREFERRED EMBODIMENTS

The present invention will be described in detail by examples hereinbelow.

EXAMPLE 1

FIGS. 1A to 1E and FIGS. 2F to 2J are cross-sectional views showing the first half and last half of the production steps of an ink jet head valve according to the present invention, respectively.

Figure 1A:
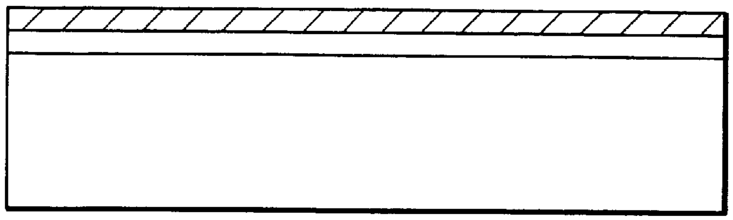
FIGS. 1A, 1B, 1C, 1D and 1E are cross-sectional views showing the first half of the production steps of an ink jet head valve according to the present invention.
Figure 1B:
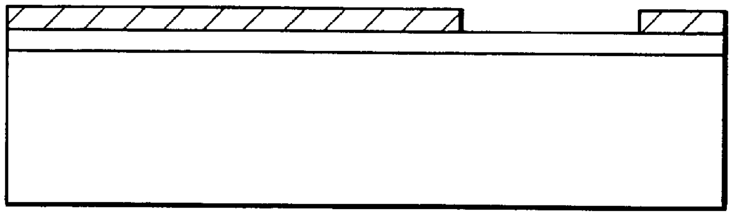
Figure 1C:
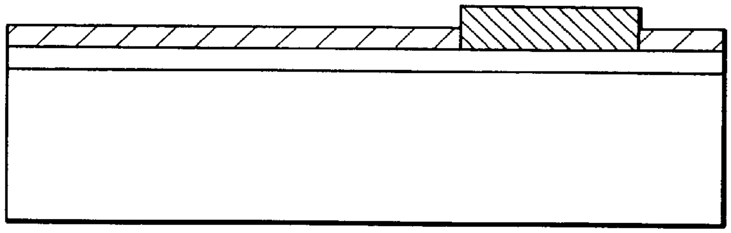

First, to form a pedestal of a valve on a substrate 1, an about 5 μm thick PSG (Phospho-Silcate Glass) film 102 is formed on a Ta film 101 used as an anti-cavitation film at a temperature of 350° C. by a plasma CVD process (FIG. 1A). Then, to perform patterning of the PSG film by the photolithography process, resist material is spin-coated on the PSG film to form a resist film thereon. After that a predetermined portion of the resist layer is exposed and developed. In this case, as a film material for forming the pedestal of a valve, PSG was used. However, the material is not limited to PSG, other materials such as an inorganic material, for example, BPSG (Born Phospho-Silicate Glass), or SiO or the like, or an organic material may be used, if such material is not changed in quality in a metal CVD process which will be described later. Then, the PSG film is etched by a buffered hydrogen fluoride to form a desired PSG film pattern (FIG. 1B). Then, an about 5 μm thick tungsten film 61 is formed on the obtained substrate by a selective tungsten (W) CVD process using conditions of mixed gases and the mixing ratio of $WF_6/SiH_4/H_2$=10/7/1000 sccm, pressure of 26.6 Pa, and temperature of 260° C. The tungsten film is selectively formed only on an exposed Ta portion, thereby forming a pedestal of a valve 61 (FIG. 1C).

Although W is selected as the material of the pedestal of a valve, the material is not limited to W; Ta, Pt, Mo, Cr, Mn, Fe, Co, Ni, Cu, or the like may be used, if they function as the materials of the valve pedestal and the valve itself. Alternatively, the materials of the pedestal and valve may be varied as needed.

Figure 1D:
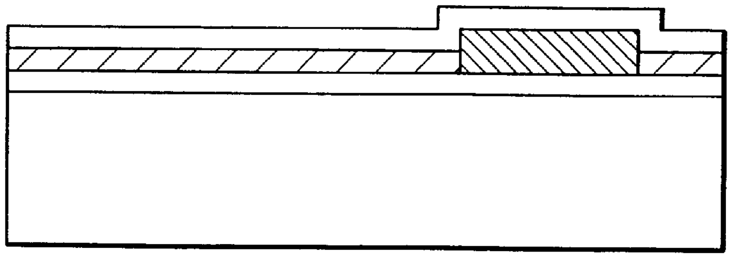
Figure 1E:
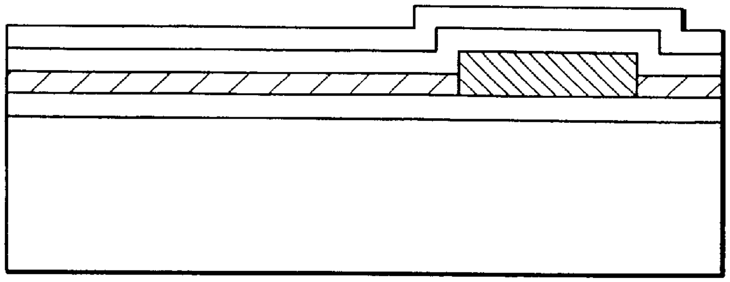
Figure 2F:
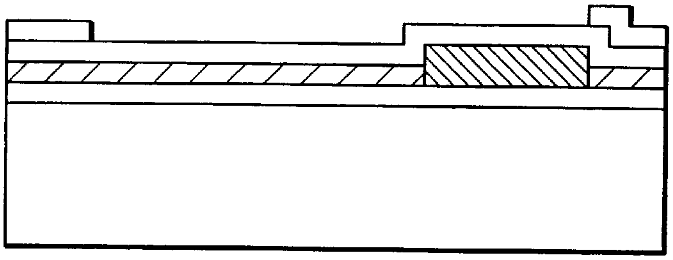
FIGS. 2F, 2G, 2H, 2I and 2J are cross-sectional views showing the last half of the production steps of an ink jet head valve according to the present invention.

After that, on the obtained substrate is formed an 1000 angstrom thick Ni wiring layer, 103 by a sputtering process (FIG.1D). The Ni wiring layer is used for forming a valve material using a metal CVD process. In this case, the wiring layer was formed with Pd. However, other metals may be used. Then, an about 5 μm thick PSG film 104 is formed by a plasma CVD process (FIG. 1E,. As the insulating film, a PSG film was used. However, the insulating material is not limited to PSG, other materials such as an inorganic material, for example, BPSG, or SiO or the like, or an organic material may be used, if such material is not changed in quality in a metal CVD process which will be described later. Then, the PSG film is etched by a buffered hydrogen fluoride (HF) to form a desired PSG film pattern (FIG. 2F).

Figure 2G:
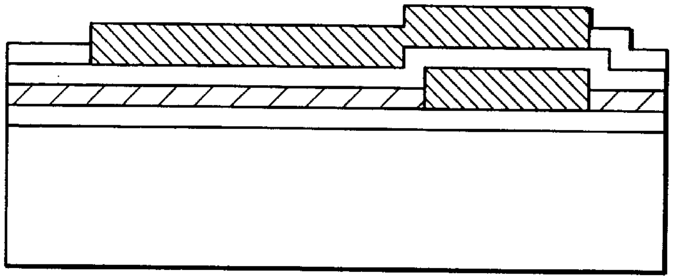

Then, an about 5 μm thick tungsten film is formed on the obtained substrate by a selective tungsten (W) CVD process using conditions of mixed gases and the mixing ratio of $WF_6/SiH_4/H_2$=10/7/1000 sccm, pressure of 26.6 Pa, and temperature of 260° C. The tungsten film is selectively formed only on an exposed Pd portion, thereby forming a valve 62 (FIG. 2G).

Figure 2H:
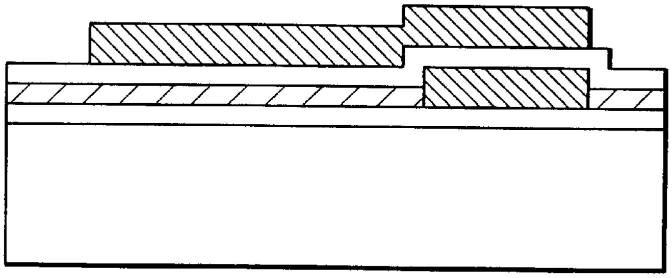
Figure 2I:
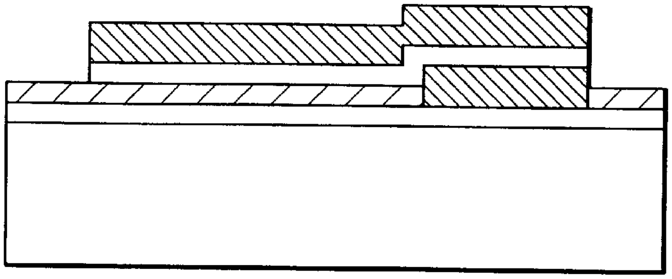

Then, the PSG film around the valve is removed by a buffered hydrogen fluoride (FIG. 2H). After that Ni wiring layer is removed by hydrogen peroxide solution (FIG. 2I). Finally, the exposed PSG film is removed by the buffered hydrogen fluoride to form a pedestal 61 and valve 62 (FIG. 2J).

EXAMPLE 2

Figure 2J:
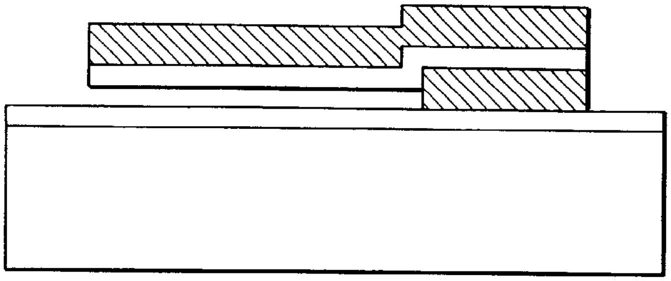
Figure 5:
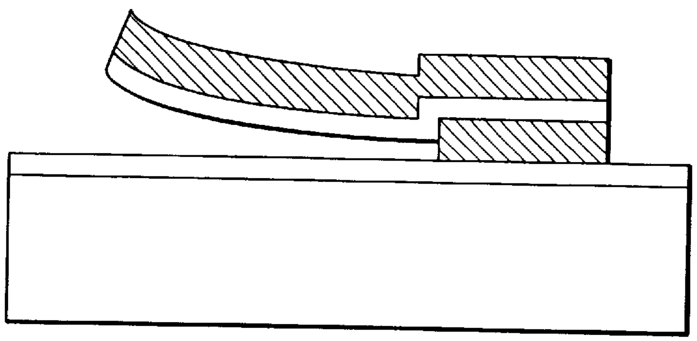
FIG. 5 is a cross-sectional view of an ink jet head valve produced in Example 2.

In the steps shown in FIGS. 1A to 1E and FIGS. 2F to 2J in Example 1, if stresses of the underlying wiring layer and metal layer formed by a metal CVD process are controlled, a previously curved valve having a cross-sectional view of FIG. 5 not FIG. 2J, can be formed as the final configuration. The reference numerals in FIG. 5 have the same meaning as in FIGS. 1 and 2.

For example, if an underlying wiring layer is formed by a compression stress of $1\times10^9$ dyn/cm$^2$and the metal layer on the metal CVD side is formed by a tensile stress of $1\times10^9$ dyn/cm$^2$, the valve is deformed so that it is warped on the metal CVD side as shown in FIG. 5. The thus formed valve does not require power to deform the valve during bubbling and can be moved only at the time of refilling. Therefore, the valve can reduce lost energy.

OTHER EXAMPLES

Figure 3:
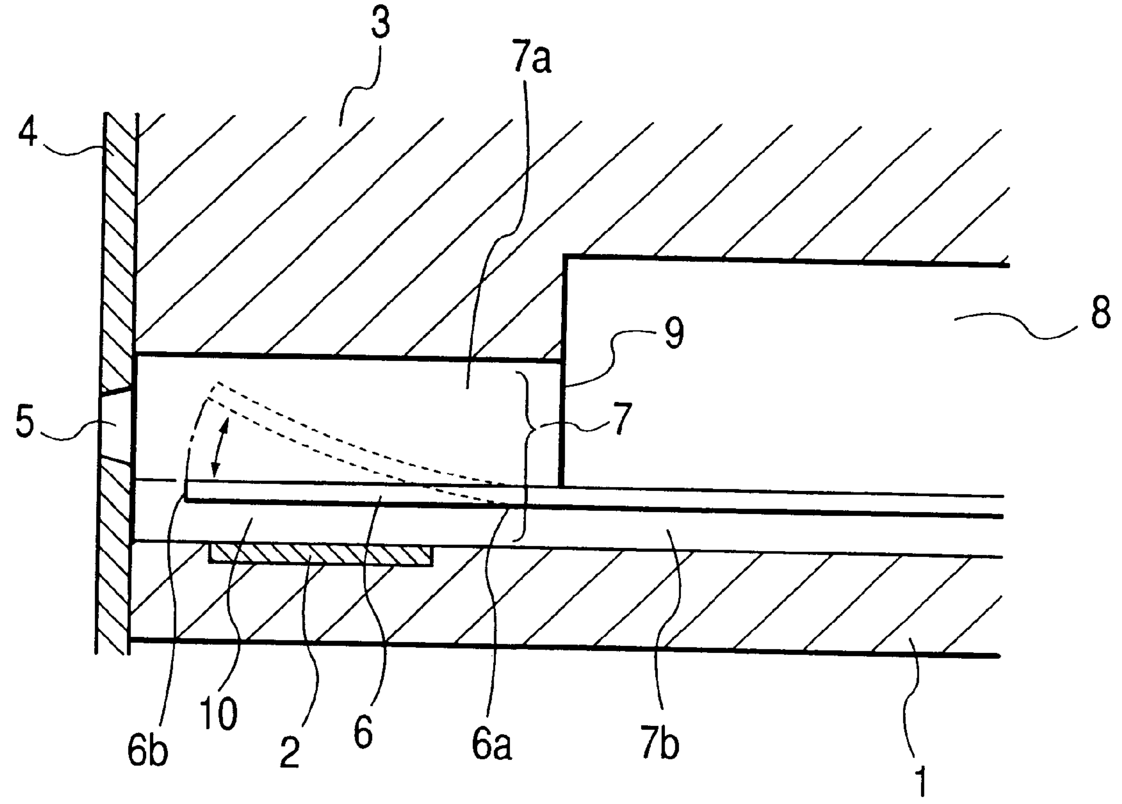
FIG. 3 is a cross-sectional view taken along the direction of a liquid flow path for explaining a basic structure of a liquid discharging head according to the present invention.
Figure 4:
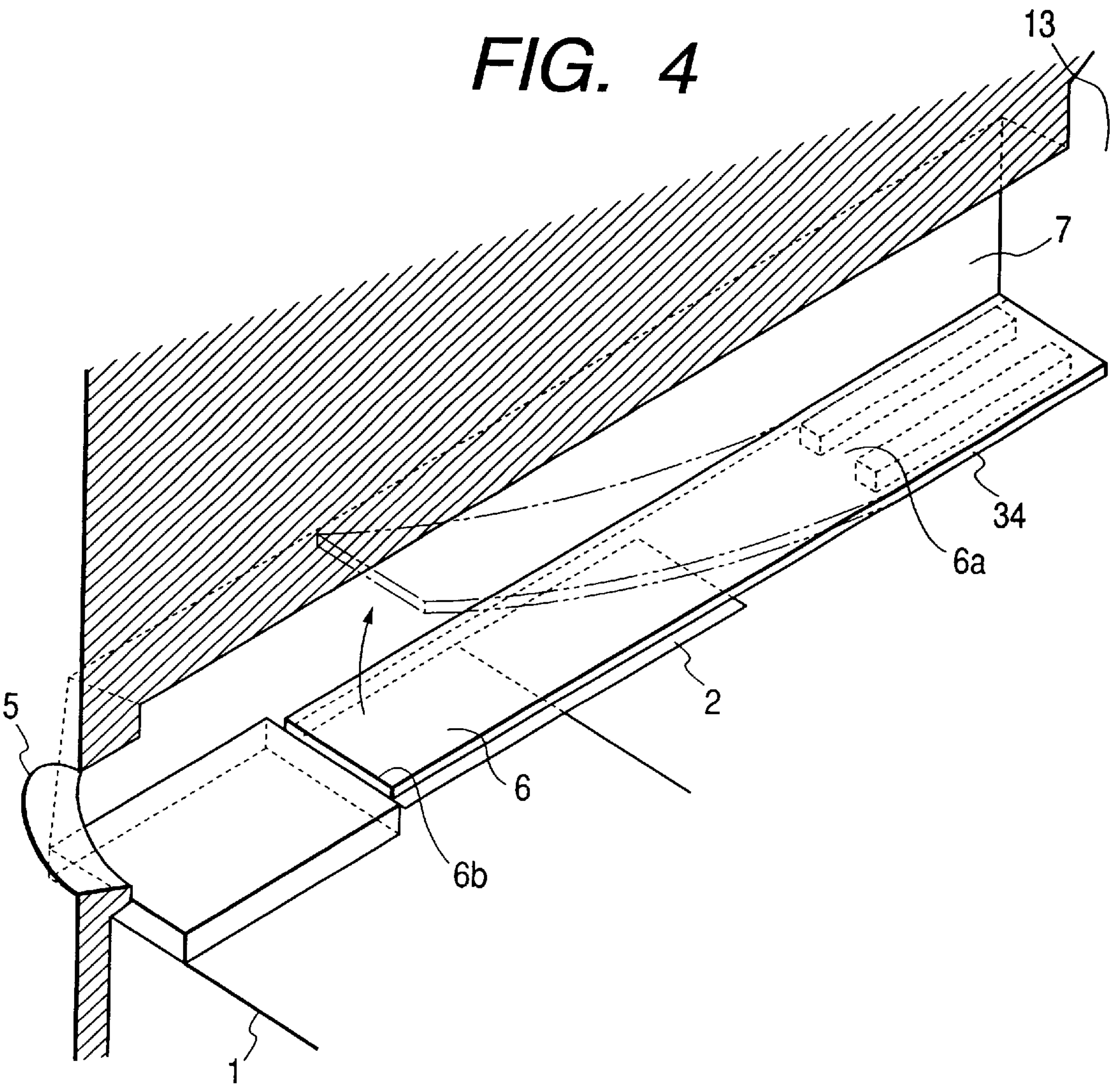
FIG. 4 is a partially broken perspective view of one embodiment of a liquid discharging head provided with an ink jet head valve.

FIG. 3 is a cross-sectional view taken along the direction a of liquid flow path for explaining a basic structure of a liquid discharging head according to the present invention.

As shown in FIG. 3, the liquid discharging head comprises an element substrate 1 on which a plurality of heating elements 2 (only one of them are shown in FIG. 3) for imparting a bubble generating heat energy to liquid are provided in parallel, a top plate 3 connected to another member above this element substrate 1, and an orifice plate 4 connected to the front edges of the element substrate 1 and top plate 3.

The element substrate 1 is formed by forming a silicon oxide film or silicon nitride film for insulation and heat accumulation on a substrate of, for example, silicon or the like, and forming a patterned electric resistance layer forming the heating element 2, and a patterned wiring, on the film. The heating element 2 is heated by applying the voltage to the electric resistance layer from this wiring and flowing current to the electric resistance layer.

The top plate 3 is formed to form a plurality of liquid flow paths 7 corresponding to each of the heating elements 2 and a common liquid chamber 8 for supplying liquid to each of the liquid flow paths 7. A flow path side wall 9 extending between the heating elements from a ceiling portion is integrally provided with the top plate 3. The top plate 3 is composed of a silicon type material, and can be formed by etching the patterns of the liquid flow path 7 and common liquid chamber 8, or depositing a material of the flow path side wall 9, such as silicon nitride or silicon oxide etc., and etching the portion of the liquid flow path 7.

The orifice plate 4 is formed a plurality of discharge ports 5, each of which is communicated with the common liquid chamber 8 through each of the liquid flow paths 7. The discharge port 5 corresponds to each of the liquid flow paths 7. The orifice plate 4 is also composed of silicon type material and can be formed, for example, by planing a silicon substrate provided with a discharge port 5 to about 10 to 150 μm. The orifice plate 4 is not always a required part of the present invention. In place of provision of the orifice plate 4, when the liquid flow path 7 is formed in the top plate 3, a wall having substantially the same thickness as that of the orifice plate 4 is left in the top plate 3 and the discharge port 5 is formed in the wall portion, whereby a top plate with a discharge port can be formed.

Further, the liquid discharging head is provided with a cantilever type movable member 6 positioned opposingly to the heating element 2 so that the liquid flow path 7 is divided into a first liquid flow path 7*a* communicated with the discharge port 5 and a second liquid flow path 7*b* having the heating element 2. The movable member is a thin film composed of a silicon type material, such as silicon nitride, silicon oxide or the like.

This movable member 6 is provided at a position facing the heating element 2 while having a desired distance from the heating element 2 and covering it. The movable member 6 has a fulcrum 6*a* on the upstream side of a large flow which flows from the common liquid chamber 8 to the discharge port side through the movable member 6 by the discharging action of liquid, and a free end 6*b* on the downstream side with respect to the fulcrum 6*a*. The space between this heating element 2 and movable member 6 becomes a bubble generation region 10.

When the heating element is heated, based on the above-mentioned constitution, heat is acted on the liquid of the bubble generation region 10 between the movable member 6 and heating element 2, thereby generating bubbles on the heating element 2 due to the film boiling phenomena and being grown. The pressure generated by the growth of the bubbles is preferentially acted on the movable member 6. The movable member 6 is displaced so that it is greatly opened or pivoted on the discharge port 5 side keeping the fulcrum 6a as the center, as shown in FIG. 3 by a broken line. By the displacement of the movable member 6 or the state of the liquid displaced thereby, propagation of pressure due to the generation of bubbles and grown bubbles themselves are led to the discharge port 5 side, whereby liquid is discharged from the discharge port 5.

Namely, by providing the movable member 6 having the fulcrum 6a on the upstream side (common liquid chamber 8 side) of the liquid flow in the liquid flow path 7 and the free end 6b on the downstream side (discharge port 5 side), on the bubble generation region 10, the bubble pressure propagation direction is led to the downstream side and the bubble pressure directly and efficiently contributes to the discharge of liquid. Further, the bubble growth direction itself is also led to the downstream side as in the pressure propagation direction, whereby bubbles are further largely grown in the downstream than in the upstream side. Thus, by controlling the bubble growth direction itself with the movable member and controlling the bubble pressure propagation direction, fundamental discharge properties such as discharge efficiency, discharge output, or discharge speed etc., can be improved.

On the other hand, when bubbles are in a bubble vanishing step, the bubbles are rapidly vanished by a multiplier effect of elasticity of the movable member 6 and the movable member 6 is finally returned to the original position as shown in FIG. 3 by a solid line. In this case, to compensate the shrinkage volume of bubbles in the bubble generation region 10 and to compensate the amount for the volume of discharged liquid, liquid flows from the upstream side, that is the common liquid chamber 8 side to refill liquid into the liquid flow path 7. This refilling of the liquid can be efficiently, reasonably and stably performed by the return action of the movable member 6.

According to the present invention, positioning a valve with a high precision can be realized by the photolithography steps and controlling of the valve thickness can be easily performed, whereby simplified steps can be realized.

Further, according to the present invention, the ink jet head valve can be produced in a curved shape by the stress control of an underlying metal layer and the CVD stress control.

What is claimed is:

1. A method of producing an ink jet head having a discharge port for discharging ink, an ink flow path communicated with said discharge port and an electrothermal converting member used as an energy generating means for discharging ink into said ink flow path, comprising the steps of:

preparing a substrate provided with said electrothermal converting member and having a conducting portion on the surface of said substrate;

forming a first masking layer for forming a pedestal portion of a valve of said ink jet head on said substrate surface;

etching a portion of said first masking layer, said portion being a portion where the pedestal portion of said valve is formed;

forming said pedestal portion by a metal CVD process and forming a conducting layer on said pedestal portion and first masking layer;

forming a second masking layer on said conducting layer and etching a portion of said second masking layer, said portion being a portion where a movable member is formed; and removing said first and second masking layers after forming said movable member on said conducting layer by a metal CVD process.

2. A method of producing an ink jet head according to claim 1, wherein said ink jet head valve is produced by using Ta, W, Pt, Mo, Cr, Mn, Fe, Co, Ni, or Cu.

3. A method of producing an ink jet head according to claim 1, wherein said conducting layer is formed by compression stress and said movable member is formed by tensile stress.

* * * * *

UNITED STATES PATENT AND TRADEMARK OFFICE

CERTIFICATE OF CORRECTION

PATENT NO. : 6,277,294 B1
DATED : August 21, 2001
INVENTOR(S) : Teruo Ozaki et al.

It is certified that error appears in the above-identified patent and that said Letters Patent is hereby corrected as shown below:

Column 1,
Line 31, "that includ-" should read -- including that --;
Line 32, "ing" should be deleted;
Line 37, "a printing equipment" should read -- printing equipment, --; and
Line 42, "the" should read -- to the --

Column 2,
Line 4, "a manner that" should read -- which --.

Column 4,
Line 34, "(Born" should read -- (Boron --;
Line 55, "layer, 103" should read -- layer 103 --; and
Line 60, "(FIG. 1E,." should read -- (FIG. 1E). --.

Column 5,
Line 20, "not FIG. 2J," should read -- (not FIG. 2J), --;
Line 24, "$1x10^9$ dyn/$cm^2$and" should read -- $1x10^9$ dyn/$cm^2$ and --;
Line 35, "a of" should read -- of a --;
Line 39, "are" should read -- is --;
Line 62, "oxide etc.," should read -- oxide, etc., --; and
Line 65, "a" should read -- by a --.

Column 6,
Line 59, "speed etc.," should read -- speed, etc., --.

Signed and Sealed this

Seventh Day of May, 2002

*Attest:*

JAMES E. ROGAN
*Director of the United States Patent and Trademark Office*

*Attesting Officer*